2,990,421
NEUTRAL ESTERS OF PHOSPHORIC ACID

Thomas Mason Melton, Richmond, Va., and Richard A. Matthews, Chagrin Falls, and Harry F. O'Connor, South Euclid, Ohio, assignors to Virginia-Carolina Chemical Corporation, Richmond, Va., a corporation of Virginia
No Drawing. Filed Apr. 1, 1958, Ser. No. 725,502
6 Claims. (Cl. 260—461)

This invention relates to new neutral esters of phosphoric acid and to compositions containing them. More specifically, this invention relates to ethylene oxide addition products of alkyl phosphoric acids wherein the alkyl groups contain from 1 to 5 carbon atoms. The specific compositions with which this invention is concerned are obtained by incorporating the above named neutral esters into polyvinyl alcohol formulations.

The term polyvinyl alcohol includes all resins made by the hydrolysis of polyvinyl acetate. Such compounds are widely available commercially. The physical and chemical properties vary according to the molecular weight of the parent polyvinyl acetate and the extent of hydrolysis. The residual acetate content may be practically nil; i.e., 98–100% of the acetate groups may be removed and the product is known as the "completely hydrolyzed" grade. The general practice is to report the percent acetate content of the hydrolyzed product; any product containing an appreciable amount of acetate groups is known as a "partially hydrolyzed" grade.

Polyvinyl alcohol has many uses. It can be extruded, molded or cast. Extrusion or compression molding forms elastomeric articles that are widely used where high resistance to solvents, oil or gases is required. For example, extruded polyvinyl tubing is used for aircraft and automotive fuel lines and for oxygen and compressed air lines. It has found use in handling paints, lacquers, dry cleaning solvents, fire-extinguisher fluids and refrigerants.

Solutions of polyvinyl alcohol are also useful. Oil- and solvent-resistant gloves are made by repeatedly dipping a mold into the solution. Films that have a variety of uses may be cast from polyvinyl alcohol solutions. Such films are made into water soluble packages for soap, bluing, bath salts, disinfectants and the like. Such packaging allows preweighed quantities to be added, thus saving time and materials. These films are also used for air tight packaging of foods and for polished metal articles. The impermeablity of the films makes them useful in oxygen tents. In addition, these films have been suggested for such uses as garment covers, aprons, capes, lamp shades, store counter covers, etc.

In all the above articles of manufacture it is desirable and often necessary that the original plasticity of the polyvinyl alcohol product be retained. Normally a plasticizer is added to the polyvinyl alcohol to prevent brittleness due to aging. Unplasticized articles made of polyvinyl alcohol quickly become very brittle, especially if subjected to heat while aging.

In the past the most widely used plasticizers have been glycerine, diethylene glycol or triethylene glycol. These compounds are effective plasticizers and produce products (molded articles or films) that are pliable, soft and have good original color.

The primary objection to the plasticizers of the prior art is their high level of volatility. Because of this feature the plasticizer is progressively lost from the polyvinyl alcohol. As much as 80% of glycerine used as a plasticizer has been known to volatilize at 105° C. in 24 hours. As a result, the article becomes stiff and brittle.

To combat this loss of plasticizer, higher glycols have been used. However, though the loss of plasticizer because of volatility is decreased, these higher glycols such as pentamethylene glycol, are much less compatible with polyvinyl alcohol.

The neutral phosphoric acid esters of our invention have been found to impart surprising properties to polyvinyl alcohol and their use gives improved compositions which do not become brittle quickly on heating as do compositions obtained using glycerine as the plasicizer. The group of plasticizers which we have discovered do not have an undesirable high level of volatility. At the same time, they are compatible with the polyvinyl alcohol. Compatibility means ability to mix without causing a hazy or foggy appearance in either the solution or the film or extruded article.

This highly important discovery means that articles can be made from polyvinyl alcohol which will not lose their plasticity on aging. We have discovered what are known in the art as permanent plasticizers. The low level of volatility of these compounds plus their ability to plasticize make them extremely useful to manufacturers of polyvinyl alcohol articles.

In addition to providing for the above, we have found that these same compounds impart another surprising and very important feature to polyvinyl alcohol. They severely retard the burning rate of films or articles made of polyvinyl alcohol, and in some instances actually cause the article to become self-extinguishing after it is ignited. This is certainly a new and novel concept in the field of plasticizers for polyvinyl alcohol. Plasticizers used in the past have never appreciably retarded the burning rate and it is our belief that these compounds are the first ones to have both plasticizer and burn retardant action.

The plasticizing and flame retarding effects of the neutral esters of phosphoric acid on polyvinyl alcohol apply to all of the various polyvinyl alcohol formulations regardless of the molecular weight and/or the extent of hydrolysis. Differences in the properties of various mixtures of the neutral esters of phosphoric acid and the polyvinyl alcohol are differences in degree only and are attributable to differences in the properties of the polyvinyl alcohol compositions used as noted above and to differences in the properties of the esters used as will appear hereinafter.

The degree to which the polyvinyl alcohol is plasticized and to which the tendency to burn is reduced, other things being equal, are proportional to the amount of plasticizer used. Generally the plasticizer is used in quantity within the range from 15% to 60% by weight based upon the weight of the polyvinyl alcohol but under some conditions useful results are obtainable with as little as 5% or as much as 75% of the plasticizer. The polyvinyl alcohols and the plasticizers are compatible in all proportions.

The new compounds that we have found to be effective plasticizers and flame retarders for polyvinyl alcohol are, as stated above, neutral esters of phosphoric acid. They are made by reacting mono and dialkyl acid phosphates and their mixtures with ethylene oxide to give neutral polyoxyethylated esters of phosphoric acids. The following generic formula represents the compounds of our invention:

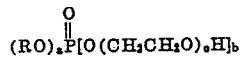

In the above generic formula, R represents an alkyl radical containing from 1 to 5 carbon atoms, $a$ and $b$ are integers whose sum is 3, and $c$ is an integer from 1 to 4.

While it is possible to make pure compounds, as will be shown in Examples V, VI, VIII, and IX, below, it is generally more economical and certainly much easier to make mixtures of the compounds embraced by the above generic formula. By mixtures is meant a composition containing a compound wherein $a$ is 1 and $b$ is 2 and a compound wherein $a$ is 2 and $b$ is 1. It is also possible to have mixtures defined by varying the value of $c$.

All compounds and mixtures of compounds embraced by the above formula are effective as plasticizers and flame retarders for polyvinyl alcohol regardless of the values of $a$, $b$ and $c$. Any differences between compositions of polyvinyl alcohol and compounds or mixtures of compounds embraced by the above formula are merely differences in degree depending upon the molecular weight and degree of hydrolysis of the polyvinyl alcohol, the ratio of polyvinyl alcohol to the neutral ester of phosphoric acid and the values of $a$, $b$ and $c$ in said neutral ester or mixture of neutral esters.

It has been shown in the prior art that an alcohol reacted with phosphorus pentoxide yields a mixture of products. Predominantly, primary and secondary acid phosphates result, though there are minor amounts of tertiary phosphates and phosphoric acid. The amounts of the products vary according to the mole ratio of alcohol to phosphorus pentoxide and to the reaction conditions. Generally, however, when three moles of the hydroxy compound is reacted with one mole of phosphorus pentoxide the reaction is represented as follows:

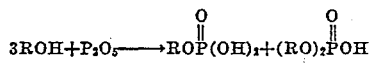

R represents an aliphatic radical.

Many of the above primary and secondary acid phosphates have been isolated. In addition, many mixtures of these compounds have been made by the reaction described. These products, the pure alkyl acid phosphates and their mixtures, are starting materials for preparing the new compounds of our invention.

Broadly speaking, the compounds of our invention are made by reacting an alkyl acid phosphate or a mixture of alkyl acid phosphates with ethylene oxide until no more ethylene oxide is absorbed. The products of this reaction are generically called polyoxyethylated alkyl phosphate esters.

More specifically, the novel compounds of our invention are prepared by bubbling gaseous ethylene oxide into the liquid alkyl acid phosphates (pure or mixed) until the reaction mixture will absorb no more ethylene oxide. The mixture is stirred throughout the addition. The reaction temperature is between 20° C. and 80° C. At the neutral point of the reaction, no more ethylene oxide is absorbed, and the reaction temperature begins falling. Generally, the reaction mixture is allowed to stand at room temperature for 1 or more hours to complete the reaction. It is then stripped of excess ethylene oxide by reduced pressure distillation, leaving the product in the distillation vessel.

While it is possible to vary the temperature of the reaction between the limits above, it is preferred to operate at temperatures in the range of 30° C. to 50° C. Lower temperatures tend to slow the reaction, while at higher temperatures the reaction is harder to control, i.e., undesirable side reactions begin to take place. The preferred temperature of operation is governed by the particular acid phosphate or phosphate mixture being used.

The following examples show specifically the preparation of polyoxyethylated alkyl phosphates wherein the alkyl group contains from 1 to 5 carbon atoms.

EXAMPLE I

*Ethylene oxide addition product of methyl and dimethyl hydrogen phosphates*

100 parts of a mixture of methyl and dimethyl hydrogen phosphates, prepared by the reaction of 3 moles of methyl alcohol with 1 mole of phosphorus pentoxide, was placed in a 3-neck reaction vessel equipped with stirrer, thermometer, addition tube, and outlet tube with trap. Ethylene oxide was bubbled into the mixture with stirring while the temperature was maintained at 40° C. by intermittent cooling. The ethylene oxide was added for 7 hours, after which the temperature began to decrease and ethylene oxide began to collect in the trap. The addition of ethylene oxide was stopped and the reaction mixture was allowed to stand overnight at room temperature.

Excess ethylene oxide was stripped out by heating the reaction mixture to 80–90° C. at 30 mm. pressure, and 261.2 parts of a mixture of the polyoxyethylated mono and dimethyl phosphate esters was obtained. The gain in weight represented 3.52 moles of ethylene oxide absorbed for each theoretical acid group in the mixture.

The product was a colorless liquid. $n_D^{23}=1.4560$; $d_4^{20}=1.277$.

EXAMPLE II

*Ethylene oxide addition product of ethyl and diethyl hydrogen phosphates*

100 parts of a mixture of ethyl and diethyl hydrogen phosphates, prepared by the reaction of 3 moles of ethyl alcohol with 1 mole of phosphorus pentoxide, was placed in a 3-neck reaction vessel, equipped with stirrer, thermometer, addition tube, and outlet tube. Ethylene oxide was bubbled into the mixture with stirring while the temperature was maintained at 40° C. After the ethylene oxide had been added intermittently for approximately 20 hours, no more was absorbed and the temperature of the reaction mixture remained constant. The addition of ethylene oxide was stopped and the reaction mixture was allowed to stand at room temperature for 24 hours.

Excess ethylene oxide was stripped out by heating the reaction mixture to 60° C. at 30 mm. pressure, and 228.1 parts of a mixture of the polyoxyethylated mono and diethyl phosphate esters was obtained. The gain in weight represented 2.70 moles of ethylene oxide absorbed for each theoretical acid group in the mixture.

The product was a colorless liquid. $n_D^{20}=1.4522$; $d_4^{20}=1.84$.

EXAMPLE III

*Ethylene oxide addition product of isopropyl and diisopropyl hydrogen phosphates*

100 parts of a mixture of isopropyl and diisopropyl hydrogen phosphates, prepared by the reaction of 3 moles of isopropyl alcohol with 1 mole of phosphorus pentoxide, was placed in a 3-neck reaction vessel equipped with stirrer, thermometer, addition tube, and outlet tube. For 8 hours ethylene oxide was bubbled into the mixture with stirring while the temperature was maintained at 40° C. After the addition of ethylene oxide was stopped, the reaction mixture was allowed to stand at room temperature for approximately 60 hours (over the week-end).

Excess ethylene oxide was stripped out by heating the reaction mixture to 60° C. at 30 mm. pressure, and 215.3 parts of a mixture of the polyoxyethylated mono and diisopropyl phosphate esters was obtained. The gain in weight represented 2.78 moles of ethylene oxide absorbed for each theoretical acid group in the mixture.

The product was a colorless liquid. $n_D^{20}=1.4497$; $d_4^{20}=1.159$.

EXAMPLE IV

*Ethylene oxide addition product of butyl and dibutyl hydrogen phosphates*

100 parts of a mixture of butyl and dibutyl hydrogen phosphates, prepared by the reaction of 3 moles of butyl alcohol with 1 mole of phosphorus pentoxide, was placed in a 3-neck reaction vessel equipped with stirrer, thermometer, addition tube, and outlet tube with trap. Ethylene oxide was bubbled into the mixture with stirring while the temperature was maintained at 40° C. The ethylene oxide was added intermittently for 15 hours, after which the temperature began to decrease and ethylene oxide began to collect in the trap. The addition of ethylene oxide was stopped and the reaction mixture was allowed to stand at room temperature overnight.

Excess ethylene oxide was stripped out by heating the reaction mixture to 60° C. at 30 mm. pressure for 4 hours, after which no more ethylene oxide was evolved. 202.7 parts of a mixture of the polyoxyethylated mono and dibutyl phosphate esters was obtained. The gain in weight represented 2.83 moles of ethylene oxide adsorbed for each theoretical acid group in the mixture.

The product was a straw-colored liquid. $n_D^{27} = 1.4469$; $d_4^{20} = 1.122$.

EXAMPLE V

*Ethylene oxide addition product of butyl dihydrogen phosphate*

100 parts of butyl dihydrogen phosphate was placed in a 3-neck reaction vessel equipped with stirrer, thermometer, addition tube, and outlet tube. Ethylene oxide was bubbled into the liquid with stirring while the temperature was maintained at 40° C. After the ethylene oxide has been added intermittently for 6.5 hours, no more was absorbed by the butyl dihydrogen phosphate. The addition of ethylene oxide was stopped and the reaction mixture was allowed to stand at room temperature for 5 days.

Excess ethylene oxide was stripped out by heating the reaction mixture to 90° C at 30 mm. pressure, and 240.8 parts of the polyoxyethylated monobutyl phosphate ester was obtained. The gain in weight represented 2.47 moles of ethylene oxide absorbed for each theoretical acid group.

The product was a straw-colored liquid. $n_D^{20} = 1.4559$; $d_4^{20} = 1.196$.

EXAMPLE VI

*Ethylene oxide addition product of dibutyl hydrogen phosphate*

100 parts of dibutyl hydrogen phosphate was placed in a 3-neck reaction vessel equipped with stirrer, thermometer, addition tube, and outlet tube with trap. Ethylene oxide was bubbled into the liquid with stirring while the temperature was maintained at 40° C. The ethylene oxide was added for 1.5 hours, after which the temperature of the reaction mixture remained constant and ethylene oxide began to collect in the trap. The addition of ethylene oxide was stopped and the reaction mixture was allowed to stand at room temperature for 4 days.

Excess ethylene oxide was stripped out by heating the reaction mixture to 95° C. at 30 mm. pressure, and 157.9 parts of the polyoxyethylated dibutyl phosphate ester was obtained. The gain in weight represented 2.77 moles of ethylene oxide absorbed for each theoretical acid group.

The product was a light straw-colored liquid. $n_D^{20} = 1.4373$; $d_4^{20} = 1.078$.

EXAMPLE VII

*Ethylene oxide addition product of amyl and diamyl hydrogen phosphates*

100 parts of a mixture of amyl and diamyl hydrogen phosphates, prepared by the reaction of 3 moles of amylalcohol with 1 mole of phosphorus pentoxide, was placed in a 3-neck reaction vessel equipped with stirrer, thermometer, addition tube, and outlet tube with trap. Ethylene oxide was bubbled into the mixture with stirring while the temperature was maintained at 40° C. The ethylene oxide was added intermittently for 19.5 hours, after which the temperature began to decrease and ethylene oxide began to collect in the trap. The addition of ethylene oxide was stopped and the reaction mixture was allowed to stand at room temperature overnight.

Excess ethylene oxide was stripped out by heating the reaction mixture to 75° C. at 20 mm. pressure, and 174.1 parts of a mixture of polyoxyethylated mono and diamyl phosphate esters was obtained. The gain in weight represented 2.28 moles of ethylene oxide absorbed for each theoretical acid group in the mixture.

The product was a yellow liquid. $n_D^{20} = 1.4499$; $d_4^{20} = 1.109$.

EXAMPLE VIII

*Ethylene oxide addition product of amyl dihydrogen phosphate*

100 parts of amyl dihydrogen phosphate was placed in a 3-neck reaction vessel equipped with stirrer, thermometer, addition tube, and outlet tube. Ethylene oxide was bubbled into the liquid with stirring while the temperature was maintained at 40° C., until no more was absorbed by the reaction mixture. After the addition of ethylene oxide was stopped, the reaction mixture was allowed to stand at room temperature for 6 days.

Excess ethylene oxide was stripped out by heating the reaction mixture to 85° C. at 30 mm. pressure, and 183.4 parts of the polyoxyethylated monoamyl phosphate ester was obtained. The gain in weight represented 1.59 moles of ethylene oxide absorbed for each theoretical acid group.

The product was a yellow liquid. $n_D^{23} = 1.4539$; $d_4^{20} = 1.158$.

EXAMPLE IX

*Ethylene oxide addition product of diamyl hydrogen phosphate*

100 parts of diamyl hydrogen phosphate was placed in a 3-neck reaction vessel equipped with stirrer, thermometer, addition tube, and outlet tube with trap. Ethylene oxide was bubbled into the liquid with stirring while the temperature was maintained at 40° C. The ethylene oxide was added for 2 hours, after which the temperature began to decrease and ethylene oxide began to collect in the trap. The addition of ethylene oxide was stopped and the reaction mixture was allowed to stand at room temperature for 9 days.

Excess ethylene oxide was stripped out by heating the reaction mixture to 95° C. at 30 mm. pressure, and 128.9 parts of the polyoxyethylated diamyl phosphate ester was obtained. The gain in weight represented 1.56 moles of ethylene oxide absorbed for each theoretical acid group.

The product was a yellow liquid. $n_D^{23} = 1.4379$; $d_4^{20} = 1.042$.

Extensive experiments were made to determine the various effects of these polyoxyethylated alkyl phosphates on different types of polyvinyl alcohol. Low, intermediate and high molecular weight polyvinyl alcohols were used. Both completely hydrolyzed and partially hydrolyzed grades were included. The results of our experiments are given in the tables below. They show the very definite features that these compounds have as plasticizers and flame retarders for polyvinyl alcohols.

In all cases the solutions were made up according to accepted commercial procedure. The polyvinyl alcohol was first dissolved in water by known methods to give a 10% solids solution. Then the neutral phosphate esters were added, and the solution mixed until it became homogeneous. The films were prepared by drawing down on glass with a standard film applicator. The following tables show the various polyvinyl alcohols used and the various plasticizer compounds as well as concentrations, results of tests, etc. The term "plasticizer R group" refers to the alcohol which was used to make the alkyl hydrogen phosphate or mixture which was then reacted with ethylene oxide as shown in the foregoing examples.

In Tables I to V mixtures of the alkyl dihydrogen and the dialkyl hydrogen phosphates were used which resulted from the reaction of 3 moles of the alcohol with 1 mole of phosphorus pentoxide.

Table I

POLYOXYETHYLATED ALKYL PHOSPHATES IN 10% ELVANOL 51-05 [1] SOLUTIONS

| Plasticizer R Group | Percent Compd. on PVA Solids | Film Dried at °F.— Percent RH | Original Film | | Aged [2] Film | | Flexibility | | Percent Loss of Plasticizer, 24 hrs. at 105° C. |
|---|---|---|---|---|---|---|---|---|---|
| | | | Clarity | Surface | Clarity | Surface | Original | Aged [2] | |
| methyl | 30 | 70-50 | Good | Good | Haze | Spew | Good | Fair | 19.8 |
| ethyl | 30 | 70-50 | Exc.-Clear | do | Exc | Good | do | Stiffer | 23.0 |
| isopropyl | 30 | 70-50 | do | V. Good | Exc | do | do | do | 20.6 |
| butyl | 15 | 70-50 | do | Good | Exc | do | Sl. Stiff | Stiff | 43.5 |
| Do | 30 | 70-50 | Exc | do | Exc | do | Good | Sl. Stiffer | 22.9 |
| Do | 45 | 70-50 | Sl. Haze | do | Sl. Haze | do | Exc | V. Sl. Stiffer | 24.4 |
| amyl | 30 | 70-50 | Haze | do | Haze | do | Fair | V. Stiff | 26.3 |
| octyl | 30 | 70-50 | V. Hazy | Sl. Spew | V. Hazy | do | do | do | 16.4 |
| Commercial Plasticizer: | | | | | | | | | |
| glycerine | 30 | 70-50 | Exc | Good | Exc | do | Good | do | 79.5 |
| None | | 70-50 | Exc | do | Exc | do | Stiff | do | |

[1] Elvanol 51-05—Product of E.I. du Pont de Nemours and Co., Inc.—a low molecular weight "partially hydrolyzed" PVA—contains 11-12.5% acetate groups. See booklet entitled "Elvanol" Polyvinyl Alcohol.
[2] Aged at 105° C. for 24 hours—reconditioned at 70°±2° F. and 50% R.H.

Table I shows that in the series of our compounds tested, good original films were obtained from the methyl up through the amyl homolog. The octyl compound gave a very hazy film and showed some surface spewing, indicating incompatibility. Upon aging, the superiority of our compounds was marked. Even at a concentration as low as 15%, the butyl compound retained more flexibility than glycerine at 30%. The permanency of our compounds was clearly indicated by the retention of plasticity on aging and by the low loss of plasticizer as compared to glycerine.

Table II

POLYOXYETHYLATED BUTYL PHOSPHATE VS. GLYCERINE IN 10% VINOL PA-5 [1] SOLUTIONS

| Plasticizer R Group | Percent Compd. on PVA Solids | Film Dried at °F— Percent RH | Original Film | | Aged [2] Film | | Flexibility | | Percent Loss of Plasticizer, 24 hrs. at 105° C. |
|---|---|---|---|---|---|---|---|---|---|
| | | | Clarity | Surface | Clarity | Surface | Original | Aged [2] | |
| butyl | 15 | 70-50 | Exc | Good | Exc | Good | Sl. Stiff | Stiff | 46.1 |
| glycerine | 15 | 70-50 | Exc | do | Exc | do | V. Sl. Stiff | V. Stiff | 81.7 |
| butyl | 30 | 70-50 | Exc | do | Exc | do | Good | Sl. Stiffer | 29.9 |
| glycerine | 30 | 70-50 | Exc | do | Exc | do | do | V. Stiff | 74.9 |
| butyl | 45 | 70-50 | V. Sl. Haze | do | Clear | do | do | V. Sl. Stiffer | 23.9 |
| glycerine | 45 | 70-50 | Exc | do | Exc | do | do | V. Stiff | 70.7 |
| butyl | 60 | 70-50 | Haze | V. Sl. Tack | Haze | do | Exc | V. Sl. Stiffer | 19.8 |
| glycerine | 60 | 70-50 | Exc | Good | Exc | do | V. Flex | V. Stiff | 68.5 |

[1] Vinol PA-5—Product of Colton Chemical Co.—a low viscosity "partially hydrolyzed" PVA—contains 11-14% acetate groups. See "Technical Bulletin No. PUB-44," Feb. 28, 1956.
[2] Aging at 105° C. for 24 hours—reconditioned at 70°±2° F. and 50% R.H.

The results in Table II show that the butyl homolog of our series is superior to glycerine at all concentrations in retention of plasticity. The low loss of plasticizer is again very marked.

Further tests were made in various grades of polyvinyl alcohol. The behavior of our compounds is given in Table III.

Table III

POLYOXYETHYLATED ALKYL PHOSPHATES IN VARIOUS GRADES OF PVA

| Plasticizer R Group | Percent Compd. on PVA Solids | Elvanol 51-05 [1]—Original Film | | Elvanol 52-22 [2]—Original Film | | Elvanol 50-42 [3]—Original Film | |
|---|---|---|---|---|---|---|---|
| | | Clarity | Surface | Clarity | Surface | Clarity | Surface |
| methyl | 15 | Good | Good | | | Clear | |
| | 30 | do | do | Good | Good | Good | Good. |
| ethyl | 15 | | | | | Clear | |
| | 30 | Exc.-Clear | Good | Clear | Good | do | Do. |
| | 60 | | | Good | Sl. Spew | | |
| isopropyl | 15 | | | | | Clear | |
| | 30 | Exc.-Clear | V. Good | Clear | Sl. Spew | do | Sl. Spew. |
| butyl | 15 | do | Good | Exc | Good | do | Good. |
| | 30 | Exc | do | Good | V. Sl. Spew | V. Sl. Haze | Sl. Spew. |
| | 45 | Sl. Haze | do | Haze | Spew | Sl. Haze | Do. |
| | 60 | Haze | V. Sl. Tack | V. Hazy | do | Haze | Spew. |
| amyl | 15 | | | | | Cloudy | Sl. Spew. |
| | 30 | Haze | Good | Haze | Sl. Spew | Haze | Do. |

[1] Elvanol 51-05—See Table I.
[2] Elvanol 52-22—An intermediate molecular weight "partially hydrolyzed" PVA.
[3] Elvanol 50-42—A high molecular weight "partially hydrolyzed" PVA.

To illustrate the flame retardant activity of our compounds, the tests in Table IV were made. The PVA was Elvanol 50–42.

Table IV
BURN TESTS

| Plasticizer R Group | Percent Compound on PVA Solids | Relative Burn Rate [1] |
|---|---|---|
| methyl | 15 | 4 seconds. |
| ethyl | 15 | 28 seconds. |
| isopropyl | 15 | 16 seconds. |
| butyl | 15 | 25 seconds. |
| Do | 30 | self-extinguishing, 2–8 seconds. |
| amyl | 15 | 20 seconds. |
| Commercial Plasticizers: | | |
| glycerine | 15 | 6 seconds. |
| Do | 30 | 3–7 seconds. |
| diethylene glycol | 15 | 6 seconds. |

[1] The relative burning rate was measured by folding double a 1 x 3 inch strip of plasticized film and burning it in a horizontal position.

In all cases except that of the methyl homolog, the burn rate was severely retarded. The self-extinguishing characteristic of the butyl homolog at 30% is certainly new and unpredictable. As stated above, to our knowledge, these are the only compounds that are both effective plasticizers and flame retarders for polyvinyl alcohol.

Further flame retardant action was shown by the compounds in Elvanol 71–30, a completely hydrolyzed polyvinyl alcohol. The results are given in Table V.

Table V
BURN TESTS

| Plasticizer R Group | Percent Compd. on PVA | Relative Burn Rate[1], seconds |
|---|---|---|
| methyl | 15 | 19 |
| ethyl | 15 | 31 |
| isopropyl | 15 | 11 |
| butyl | 15 | 21 |
| amyl | 15 | 18 |
| Commercial Plasticizers: | | |
| glycerine | 15 | 4 |
| diethylene glycol | 15 | 5 |
| none | | 4 |

[1] Relative burn rate measured as in Table IV.

The pure esters disclosed in the foregoing Examples V, VI, VIII and IX give plasticizing and flame retarding effects similar to those of the mixed esters shown in Tables I to V.

We claim:

1. A neutral ester of phosphoric acid of the general formula

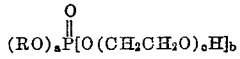

in which R represents an alkyl group containing from 1 to 5 carbon atoms, $a$ and $b$ are numbers selected from the group consisting of 1 and 2 whose sum is 3 and $c$ is an integer from 1 to 4.

2. A neutral ester as defined in claim 1 in which R contains 4 carbon atoms and $a$ has the value of 1.

3. A neutral ester as defined in claim 1 in which R contains 4 carbon atoms and $a$ has the value 2.

4. A neutral ester as defined in claim 1 in which R contains 5 carbon atoms and $a$ has the value of 1.

5. A neutral ester as defined in claim 1 in which R contains 5 carbon atoms and $a$ has the value 2.

6. Neutral esters of phosphoric acid comprising a mixture of compounds of the following formulas:

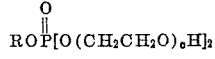

and

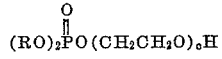

in which R represents an alkyl group containing from 1 to 5 carbon atoms and $c$ is an integer from 1 to 4.

References Cited in the file of this patent
UNITED STATES PATENTS

| | | |
|---|---|---|
| 2,266,514 | Romieux et al. | Dec. 16, 1941 |
| 2,372,244 | Adams et al. | Mar. 27, 1945 |
| 2,494,126 | Hoegberg | Jan. 10, 1950 |
| 2,759,962 | Zenftman et al. | Aug. 21, 1956 |
| 2,782,176 | Darby et al. | Feb. 19, 1957 |
| 2,783,202 | McDermott | Feb. 26, 1957 |
| 2,830,069 | Smith | Apr. 8, 1958 |
| 2,842,462 | Haas et al. | July 8, 1958 |
| 2,899,456 | Rosin | Aug. 11, 1959 |
| 2,909,559 | Lanham | Oct. 20, 1959 |

FOREIGN PATENTS

| | | |
|---|---|---|
| 721,891 | Germany | June 23, 1942 |
| 41,743 | Netherlands | Oct. 15, 1937 |